(12) United States Patent
Lin

(10) Patent No.: US 9,710,081 B2
(45) Date of Patent: Jul. 18, 2017

(54) SIGNAL TRANSMIT CHANNEL INTEGRATED WITH ESD PROTECTION AND A TOUCH SYSTEM

(71) Applicant: EGALAX_EMPIA TECHNOLOGY INC., Taipei (TW)

(72) Inventor: Po-Chuan Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 246 days.

(21) Appl. No.: 14/680,523

(22) Filed: Apr. 7, 2015

(65) Prior Publication Data

US 2016/0156177 A1 Jun. 2, 2016

(30) Foreign Application Priority Data

Nov. 28, 2014 (TW) .............................. 103141359 A

(51) Int. Cl.
*H02H 9/00* (2006.01)
*G06F 3/041* (2006.01)
(52) U.S. Cl.
CPC ............ *G06F 3/041* (2013.01); *G06F 3/0416* (2013.01); *G06F 2203/04107* (2013.01)

(58) Field of Classification Search
CPC .................. G06F 3/041; G06F 3/0416; G06F 2203/04107
USPC ..................................... 361/56; 326/112, 113
See application file for complete search history.

(56) References Cited

U.S. PATENT DOCUMENTS

| 7,518,841 | B2 * | 4/2009 | Chuang ............... H01L 27/0285 |
| | | | 361/56 |
| 9,337,651 | B2 * | 5/2016 | Lee ........................ H02H 9/04 |
| 2013/0050116 | A1 * | 2/2013 | Shin ....................... G06F 3/044 |
| | | | 345/173 |
| 2013/0141372 | A1 * | 6/2013 | Kang ..................... G06F 3/041 |
| | | | 345/173 |

* cited by examiner

*Primary Examiner* — Thienvu Tran
*Assistant Examiner* — Nicolas Bellido
(74) *Attorney, Agent, or Firm* — Huffman Law Group, PC

(57) ABSTRACT

A signal transmit (TX) channel integrated with electrostatic discharge (ESD) protection includes a transmit switch having a first end coupled to receive a transmit signal, and being controlled by an associated scanning signal such that the transmit switch is closed to pass the transmit signal at a specific time; and an ESD protection circuit having a first input end electrically coupled to a second end of the transmit switch and a second input end coupled to receive the associated scanning signal.

18 Claims, 3 Drawing Sheets

SIGNAL TRANSMIT CHANNEL INTEGRATED WITH ESD PROTECTION AND A TOUCH SYSTEM

BACKGROUND OF THE INVENTION

1. Field of the Invention

The present invention generally relates to a touch system, and more particularly to a signal transmit channel integrate with electrostatic discharge (ESD) protection.

2. Description of Related Art

A touch panel may be combined with a display screen to result in a touch screen, which has been widely used as an input interface of an electronic device for detecting a touch input within a display area. The touch technology utilized in the touch panel may, for example, capacitive, resistive or optical.

Static electricity of human body or machine into an integrated circuit may generate large transient current that damages the integrated circuit. Electrostatic discharge (ESD) protection is thus an essential and important function for the integrated circuits. As the surface of a touch panel is frequently subjected to finger touch, it thus needs ESD protection capability to ensure normal operation of the touch panel.

FIG. 1 shows a circuit diagram illustrating a signal transmit (TX) channel 200 of a conventional touch control integrated circuit integrated with ESD protection circuit 20. A transmit signal is allowed to pass one signal transmit channel to an output end TXn at a time in order to drive a touch panel (not shown). When a scanning signal Sn closes a switch W and an inverted scanning signal SBn turns off a transistor Ms0, the transmit signal reaches the output end TXn. Alternatively, when the scanning signal Sn opens the switch W and the inverted scanning signal SBn turns on the transistor Ms0, the transmit signal is blocked from the output end TXn. When the transistor Ms0 is turned on, the transistor Ms0 should be a large-size device, which requires large circuit area and manufacture cost, in order to pull down the output end TXn to ground. Moreover, as the transistor Ms0 lies in an ESD path, it is liable to ESD damage.

Therefore, a need has arisen to propose a novel touch control circuit integrated with ESD protection to improve disadvantages of conventional touch control circuits.

SUMMARY OF THE INVENTION

In view of the foregoing, it is an object of the embodiment of the present invention to provide a signal transmit channel integrated with an electrostatic discharge (ESD) protection circuit adaptable to a touch system. Large-size devices are less in the embodiment to reduce circuit area and lower manufacture cost.

According to one embodiment, a signal transmit channel integrated with electrostatic discharge (ESD) protection includes a transmit switch and an ESD protection circuit. The transmit switch has a first end coupled to receive a transmit signal, and is controlled by an associated scanning signal such that the transmit switch is closed to pass the transmit signal at a specific time. The ESD protection circuit has a first input end electrically coupled to a second end of the transmit switch and has a second input end coupled to receive the associated scanning signal.

DETAILED DESCRIPTION OF THE INVENTION

Figure 2:
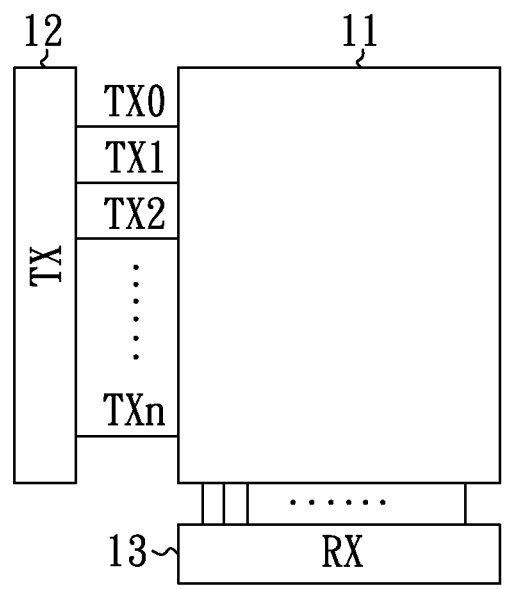
FIG. 2 shows a block diagram illustrated of a touch system.

FIG. 2 shows a block diagram illustrated of a touch system 100, which includes a touch panel 11, a signal transmit (TX) circuit 12 and a signal receive (RX) circuit 13. The touch panel 11 may be any kind of touch panel such as capacitive, resistive or optical touch panels.

The signal transmit circuit 12 includes a plurality of signal transmit channels 0, 1, 2, . . . n, which have output ends TX0, TX1, TX2, . . . TXn, respectively. When the signal transmit circuit 12 receives a transmit signal, e.g., an analog transmit signal, from a signal generator (not shown), the transmit signal is allowed to pass a specific number of channels at a time to reach the output ends in order to drive the touch panel 11. For example, the transmit signal is allowed to pass one channel at a time to reach the output end. Alternatively, the transmit signal is allowed to pass two or three channels at a time to reach the output ends. The signal receive circuit 13 receives output signals induced from the touch panel 11, and accordingly determines touch position(s) according to status of the signal transmit channels.

Figure 3A:
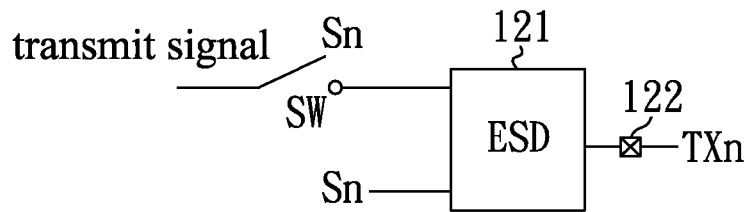
FIG. 3A shows a block diagram illustrated of a signal transmit channel integrated with electrostatic discharge (ESD) protection.

FIG. 3A shows a block diagram illustrated of a signal transmit channel 120 integrated with electrostatic discharge (ESD) protection. A signal transmit channel n is exemplified in the figure. In the embodiment, the signal transmit channel 120 includes a transmit switch SW and an ESD circuit 121, which may be made in the same integrated circuit or may be made separately.

Figure 3B:
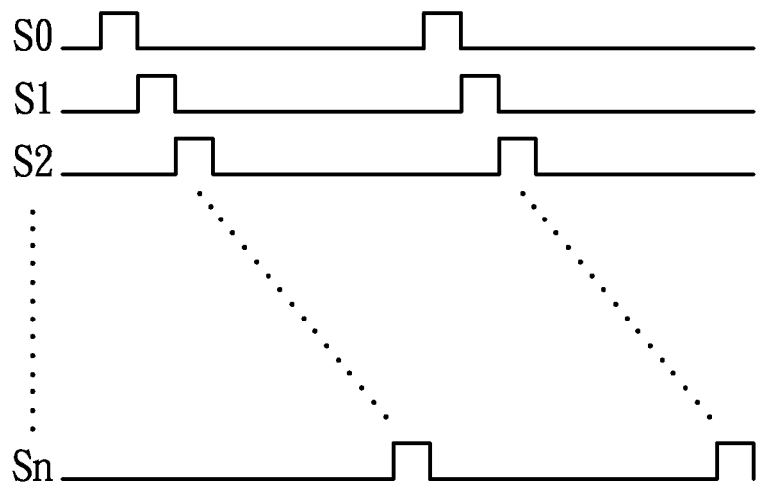
FIG. 3B shows an exemplary timing diagram illustrating scanning signals of signal transmit channels.

The transmit switch SW is controlled by an associated scanning signal Sn. For example, a positive-voltage-level scanning signal Sn closes the transmit switch SW, and a negative-voltage-level scanning signal Sn opens the transmit switch SW. FIG. 3B shows an exemplary timing diagram illustrating scanning signals S0, S1, S2, . . . Sn of signal transmit channels 0, 1, 2, . . . n. The timing diagram illustrated in FIG. 3B is exemplified for the embodiment, and the scanning signals S0, S1, S2, . . . Sn may nevertheless have specific order for a particular application. As shown in the figure, a specific number (e.g., one) of scanning signals have a positive-voltage level at a time, and therefore only the transmit switches SW of associated signal transmit channels are closed, while the transmit switches SW of other signal transmit channels are open.

A first end of the transmit switch SW receives the transmit signal, and a second end of the transmit switch SW is connected to a first input end of the ESD protection circuit 121. A second input end of the ESD protection circuit 121 receives the associated scanning signal Sn. An output end of the ESD protection circuit 121 is connected to the touch panel 11 via a pad 122.

Figure 4:
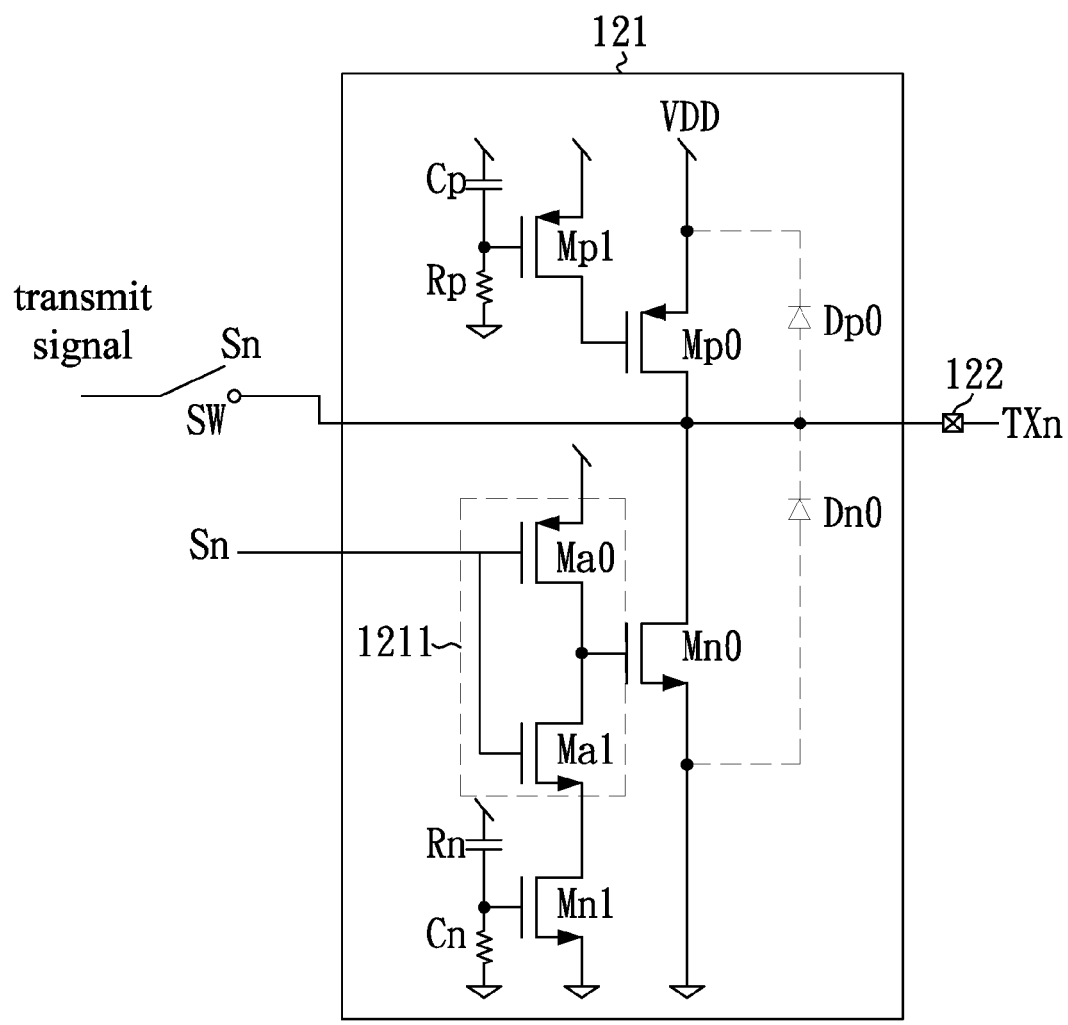
FIG. 4 shows a circuit diagram of the ESD protection circuit of FIG. 3.

FIG. 4 shows a circuit diagram of the ESD protection circuit 121 of FIG. 3. In the embodiment, the ESD protection circuit 121 includes a first N-type transistor Mn0 (e.g., N-type metal-oxide-semiconductor (MOS) transistor or NMOS transistor) and a first P-type transistor Mp0 (e.g., P-type MOS transistor or PMOS transistor), which are connected in series and are connected to ground and power VDD, respectively. In the embodiment, ground may be VSS or other reference point of a circuit. Specifically, drains of the first P-type transistor Mp0 and the first N-type transistor Mn0 are connected to the first input end and the output end of the ESD protection circuit 121. A source of the first P-type transistor Mp0 is connected to power VDD, and a source of the N-type transistor Mn0 is connected to ground. The first P-type transistor Mp0 and the first N-type transistor Mn0 have a first parasitic diode Dp0 and a second parasitic diode Dn0, respectively, which have a forward current directed from ground to power VDD. As the first P-type transistor Mp0 and the first N-type transistor Mn0 are used to leak out an ESD current, they should use large-size transistors.

In the specification, a large-size transistor is relative to and compared with a small-size transistor. In the embodiment, a large-size transistor is a transistor that is capable of leaking out an ESD current for a transient time (e.g., some nanoseconds). For example, regarding Human-body model (HBM) with a 2000-volt ESD voltage, a peak value of a transient ESD current is about 1.33 ampere (that is, equivalent human ESD resistance is 1.5 thousand ohms=2 thousand volts/1.33 ampere). Regarding Machine model (MM), as equivalent ESD resistance is 0 and equivalent capacitance is 200 picoFarads, a transient ESD current is some amperes.

Specifications (e.g., width and length) of a large-size transistor and a small-size transistor may vary according to processes. In one embodiment, a large-size transistor may be greater than a small-size transistor in width by at least one order of magnitude. For 0.18 micrometer process, in which a transistor has a width less than one micrometer (e.g., 0.44 micrometer), a large-size transistor has a width more than 100 micrometers (e.g., 440 micrometers) and a small-size transistor has a width less than 10 micrometers (e.g., 1 micrometer).

Still referring to FIG. 4, the ESD protection circuit 121 also includes a second P-type transistor Mp1 (e.g., PMOS transistor), which has a source and a drain respectively connected to power VDD and a gate of the first P-type transistor Mp0. A gate of the second P-type transistor Mp1 receives an output of a first resistor-capacitor (RC) circuit, which is comprised of a capacitor Cp and a resistor Rp that are connected in series and respectively connected to power VDD and ground.

The ESD protection circuit 121 also includes a switching controller 1211 and a second N-type transistor Mn1 (e.g., NMOS transistor), which are connected in series and respectively connected to power VDD and ground. Specifically, one end of the switching controller 1211 is connected to power VDD, and another end of the switching controller 1211 is connected to a drain of the second N-type transistor Mn1. An input end of the switching controller 1211 receives an associated scanning signal Sn, and an output end of the switching controller 1211 is connected to a gate of the first N-type transistor Mn0. A gate of the second N-type transistor Mn1 receives an output of a second resistor-capacitor (RC) circuit, which is comprised of a resistor Rn and a capacitor Cn that are connected in series and respectively connected to power VDD and ground. As the second P-type transistor Mp1 and the second N-type transistor Mn1 are not used to leak out an ESD current, they may use small-size transistors.

In the embodiment, the switching controller 1211 includes a third P-type transistor Ma0 (e.g., PMOS transistor) and a third N-type transistor Ma1 (e.g., NMOS transistor), which are connected in series and respectively connected to power VDD and a drain of the second N-type transistor Mn1.

Specifically, drains of the third P-type transistor Ma0 and the third N-type transistor Ma1 act as an output end that is connected to a gate of the first N-type transistor Mn0, and gates of the third P-type transistor Ma0 and the third N-type transistor Ma1 act as an input end to receive the associated scanning signal Sn. Further, sources of the third P-type transistor Ma0 and the third N-type transistor Ma1 are respectively connected to power VDD and a drain of the second N-type transistor Mn1. As the third P-type transistor Ma0 and the third N-type transistor Ma1 are not used to leak out an ESD current, they may use small-size transistors.

According to the embodiment described above, at the beginning of performing PS-mode ESD (i.e., the transmit signal is a positive impulse and power VDD is floating), gates of the first N-type transistor Mn0 and the second N-type transistor Mn1 are coupled to the same voltage due to gate capacitive coupling. The floated power VDD is charged to a high-voltage level via the first parasitic diode Dp0. At the beginning of ESD, the gate of the second N-type transistor Mn1 has a voltage being equivalent to ground because of being connected the second RC circuit. Therefore, the second N-type transistor Mn1 is in a closed status no matter what voltage level of the scanning signal Sn, and a voltage coupled to the gate of the first N-type transistor Mn0 will not leak out (that is, the gate of the first N-type transistor Mn0 is dynamically floating). Accordingly, the first N-type transistor Mn0 is capable of leaking out an ESD current in time.

After finishing ESD, the second N-type transistor Mn1 is turned on, and, at the same time, one of the third P-type transistor Ma0 and the third N-type transistor Ma1 is turned off no matter what voltage level of the scanning signal Sn, thereby leakage path through Ma0-Ma1-Mn1 (from power VDD to ground) may be prevented.

When the scanning signal Sn is a low-voltage level, it indicates that the transmit signal is not supposed to reach the touch panel 11. At this time, the third P-type transistor Ma0 is turned on, such that the gate of the first N-type transistor Mn0 is pulled up to power VDD, thereby turning on the first N-type transistor Mn0. Accordingly, the output end of the ESD protection circuit 121 is pulled down to ground.

When the scanning signal Sn is a high-voltage level, it indicates that the transmit signal is supposed to reach the touch panel 11. At this time, the third P-type transistor Ma0 is turned off and the third N-type transistor Ma1 is turned on. The second N-type transistor Mn1 is turned on, and the gate of the first N-type transistor Mn0 is thus pulled down to ground, thereby turning off the first N-type transistor Mn0. Similarly, the second P-type transistor Mp1 is turned off. Accordingly, the transmit signal may be transferred to the output end of the ESD protection circuit 121.

In the PS-mode ESD exemplified above, the gate of the first N-type transistor Mn0 is dynamically floating. Similarly, the gate of the first P-type transistor Mp0 is dynamically floating when performing ND-mode ESD (i.e., the transmit signal is a negative impulse and ground is floating). In NS-mode ESD (i.e., the transmit signal is a negative impulse and power VDD is floating), the second parasitic diode Dn0 is forward-biased and thus has high ESD tolerance. Similarly, in PD-mode ESD (i.e., the transmit signal is a positive impulse and ground is floating), the first parasitic diode Dp0 is forward-biased and thus has high ESD tolerance.

Figure 1:
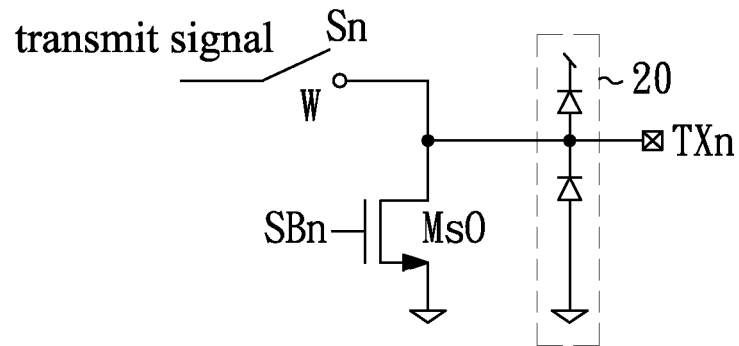
FIG. 1 shows a circuit diagram illustrating a signal transmit (TX) channel of a conventional touch control integrated circuit integrated with ESD protection circuit.

Compared with a conventional signal transmit (TX) channel (such as the signal transmit channel 200 of FIG. 1), the present embodiment uses less large-size transistors (such as the transistor Ms0 in FIG. 1), and circuit area and manufacture cost may thus be decreased. Moreover, the embodiment does not need the inverted scanning signal SBn, thereby preventing ESD damage of the transistor Ms0.

Although specific embodiments have been illustrated and described, it will be appreciated by those skilled in the art that various modifications may be made without departing from the scope of the present invention, which is intended to be limited solely by the appended claims.

What is claimed is:

1. A signal transmit channel integrated with electrostatic discharge (ESD) protection, comprising:
   a transmit switch having a first end coupled to receive a transmit signal, the transmit switch being controlled by an associated scanning signal such that the transmit switch is closed to pass the transmit signal at a specific time; and
   an ESD protection circuit having a first input end electrically coupled to a second end of the transmit switch and having a second input end coupled to receive the associated scanning signal;
   wherein the ESD protection circuit comprises:
   a first N-type transistor and a first P-type transistor that are connected in series and respectively connected to ground and power;
   a second P-type transistor having a source and a drain respectively connected to the power and a gate of the first P-type transistor;
   a first resistor-capacitor circuit having an output fed to a gate of the second P-type transistor;
   a switching controller and a second N-type transistor that are connected in series and respectively connected to the power and the ground, an input end of the switching controller being coupled to receive the associated scanning signal and an output end of the switching controller being connected to a gate of the first N-type transistor; and
   a second resistor-capacitor circuit having an output fed to a gate of the second N-type transistor.

2. The signal transmit channel of claim 1, wherein the ESD protection circuit does not receive a signal that inverts the associated scanning signal.

3. The signal transmit channel of claim 1, wherein drains of the first P-type transistor and the first N-type transistor are connected to the first input end and an output end of the ESD protection circuit, a source of the first P-type transistor is connected to the power, and a source of the first N-type transistor is connected to the ground.

4. The signal transmit channel of claim 1, wherein one end of the switching controller is connected to the power, and another end of the switching controller is connected to a drain of the second N-type transistor.

5. The signal transmit channel of claim 1, wherein the switching controller comprises a third P-type transistor an a third N-type transistor that are connected in series and respectively connected to the power and a drain of the second N-type transistor.

6. The signal transmit channel of claim 5, wherein drains of the third P-type transistor and the third N-type transistor act as the output end of the switching controller and are connected to the gate of the first N-type transistor; gates of the third P-type transistor and the third N-type transistor act as the input end of the switching controller and are coupled to receive the associated scanning signal; and sources of the third P-type transistor and the third N-type transistor are respectively connected to the power and the drain of the second N-type transistor.

7. The signal transmit channel of claim 1, wherein the first P-type transistor and the first N-type transistor comprise large-size transistors, and the second P-type transistor, the second N-type transistor, the third P-type transistor and the third N-type transistor comprise small-size transistors.

8. The signal transmit channel of claim 7, wherein the large-size transistor is greater than the small-size transistor in width by at least one order of magnitude.

9. The signal transmit channel of claim 7, wherein the large-size transistor has a width more than 100 micrometers and the small-size transistor has a width less than 10 micrometers.

10. A touch system, comprising:
    a touch panel;
    a signal transmit circuit including a plurality of signal transmit channels coupled to receive a transmit signal which is allowed to reach an output end via a specific number of channels at a time for driving the touch panel; and
    a signal receive circuit coupled to receive output signals induced from the touch panel, the signal receive circuit determining a touch position according to status of the signal transmit channels;
    wherein each of the plurality of signal transmit channels comprises:
    a transmit switch having a first end coupled to receive the transmit signal, the transmit switch being controlled by an associated scanning signal such that the transmit switch is closed to pass the transmit signal at a specific time; and
    an ESD protection circuit having a first input end electrically coupled to a second end of the transmit switch and having a second input end coupled to receive the associated scanning signal;
    wherein the ESD protection circuit comprises:
    a first N-type transistor and a first P-type transistor that are connected in series and respectively connected to ground and power;
    a second P-type transistor having a source and a drain respectively connected to the power and a gate of the first P-type transistor;
    a first resistor-capacitor circuit having an output fed to a gate of the second P-type transistor;
    a switching controller and a second N-type transistor that are connected in series and respectively connected to the power and the ground, an input end of the switching controller being coupled to receive the associated scanning signal and an output end of the switching controller being connected to a gate of the first N-type transistor; and
    a second resistor-capacitor circuit having an output fed to a gate of the second N-type transistor.

11. The system of claim 10, wherein the ESD protection circuit does not receive a signal that inverts the associated scanning signal.

12. The system of claim 10, wherein drains of the first P-type transistor and the first N-type transistor are connected to the first input end and an output end of the ESD protection circuit, a source of the first P-type transistor is connected to the power, and a source of the first N-type transistor is connected to the ground.

13. The system of claim 10, wherein one end of the switching controller is connected to the power, and another end of the switching controller is connected to a drain of the second N-type transistor.

14. The system of claim 10, wherein the switching controller comprises a third P-type transistor an a third N-type transistor that are connected in series and respectively connected to the power and a drain of the second N-type transistor.

15. The system of claim 14, wherein drains of the third P-type transistor and the third N-type transistor act as the output end of the switching controller and are connected to the gate of the first N-type transistor; gates of the third P-type transistor and the third N-type transistor act as the input end of the switching controller and are coupled to receive the associated scanning signal; and sources of the third P-type transistor and the third N-type transistor are respectively connected to the power and the drain of the second N-type transistor.

16. The system of claim 10, wherein the first P-type transistor and the first N-type transistor comprise large-size transistors, and the second P-type transistor, the second N-type transistor, the third P-type transistor and the third N-type transistor comprise small-size transistors.

17. The system of claim 16, wherein the large-size transistor is greater than the small-size transistor in width by at least one order of magnitude.

18. The system of claim 16, wherein the large-size transistor has a width more than 100 micrometers and the small-size transistor has a width less than 10 micrometers.

* * * * *